United States Patent [19]
Smith et al.

[11] Patent Number: 5,680,610
[45] Date of Patent: Oct. 21, 1997

[54] METHOD AND APPARATUS FOR TESTING RECOVERY SCENARIOS IN GLOBAL TRANSACTION PROCESSING SYSTEMS

[75] Inventors: Bernard Smith, Minneapolis; Vance J. Klingman, Richfield, both of Minn.

[73] Assignee: Unisys Corporation, Blue Bell, Pa.

[21] Appl. No.: 375,220

[22] Filed: Jan. 19, 1995

[51] Int. Cl.$^6$ .................................................. G06F 17/30
[52] U.S. Cl. ........................................ 395/610; 395/618
[58] Field of Search ................................ 395/600, 610, 395/618

[56] References Cited

U.S. PATENT DOCUMENTS

| | | | |
|---|---|---|---|
| 5,046,002 | 9/1991 | Takashi et al. | 395/608 |
| 5,247,664 | 9/1993 | Thompson et al. | 395/610 |
| 5,335,343 | 8/1994 | Lampson et al. | 395/182.17 |
| 5,504,889 | 4/1996 | Raz | 395/611 |
| 5,546,582 | 8/1996 | Brockmeyer et al. | 395/680 |
| 5,553,234 | 9/1996 | Cotner et al. | 395/601 |
| 5,586,312 | 12/1996 | Johnson et al. | 395/610 |

OTHER PUBLICATIONS

Liu et al., "The Performance of two-phase commit protocols in the presence of site failures", Fault Tolerent Computing 1994 Int'l. Symposium (FTCS 24) IEEE Publications Ondisc Jun. 1994.

*Primary Examiner*—Thomas G. Black
*Assistant Examiner*—Greta L. Robinson
*Attorney, Agent, or Firm*—Charles A. Johnson; Mark T. Starr

[57] ABSTRACT

A system is disclosed in which recovery scenarios in a system for global transaction processing are testable with application programs. A client application program initiates a global transaction that results in multiple service requests to be processed by one or more server application programs. After processing of the service requests is complete, the client application program issues a selected test command that partially performs two-phase commit processing according to a predetermined recovery scenario. Recovery processing is initiated to recover the databases affected by the global transaction Control and status information are then returned to the client application program. After recovery processing is complete, the databases are compared to the expected states according the recovery scenario.

18 Claims, 8 Drawing Sheets

(PRIOR ART)

(PRIOR ART)

METHOD AND APPARATUS FOR TESTING RECOVERY SCENARIOS IN GLOBAL TRANSACTION PROCESSING SYSTEMS

BACKGROUND

1. Field of the Invention

This invention generally relates to distributed transaction processing systems and more particularly to the testing of two-phase commit and database recovery processing.

2. General Background

Advances in hardware and software technology, in combination with new computing models, are expanding the possible functionality for On-line Transaction Processing (OLTP) application software.

On-line Transaction Processing (OLTP) is a style of data processing in which users at terminals or workstations send messages to application programs which update databases in real time. This is in contrast to batch or queued processing of transactions where the transactions are processed at a later time. An example of an OLTP application is an airline reservation system.

A transaction may be thought of as a set of actions performed by a transaction processing system wherein the actions together exhibit the properties of Atomicity, Consistency, Isolation, and Durability (ACID). The following definitions are given in *Transaction Processing: Concepts and Techniques* by Jim Gray and Andrea's Reuter, Morgan Kaufmann Publishers, Inc., 1993, p. 6:

- Atomicity. A transaction's changes to the state are atomic; either all happen or none happen. These changes include database changes, messages, and actions on transducers.
- Consistency. A transaction is a correct transformation of the state. The actions taken as a group do not violate any of the integrity constraints associated with the state. This requires that the transaction be a correct program.
- Isolation. Even though transactions execute concurrently, it appears to each transaction, T, that other transactions execute either before T or after T, but not both.
- Durability. Once a transaction completes successfully, (commits), its changes to the state survive system failures.

To maintain the properties identified above, at the beginning of processing a transaction, a transaction processing application program invokes a Begin-Transaction function to indicate processing of a transaction has begun. This operation is typically logged to an audit file to demarcate the operations associated with a particular transaction. Following the Begin-Transaction function, the other functions associated with the application defined transaction are performed and are also logged to an audit file. If all operations associated with a transaction complete successfully, a Commit function is invoked to make permanent any state changes that have occurred as a result of the transaction. The Commit operation is logged to the audit file to indicate that all operations have completed successfully. If an error occurs during processing of the transaction and a Commit operation is not performed, a Rollback function is invoked to undo the effects of the operations performed in processing the transaction.

The Client/Server computing model provides a framework in which the functionality of transaction processing applications may be expanded. Under the traditional mainframe transaction processing application model, the user interface, application control, and data management control all execute on a single data processing system. Generally, the Client/Server computing model involves a Client application program submitting service requests to a Server application program, and the Server application program processing the requests and returning responses to the Client. Thus, a Client/Server environment has the user interface, application control, and data management control distributed among two or more data processing systems. The Server application programs must contain data management components and may also provide some functions of other components.

One widely used scheme for classifying Client/Server type systems is according to how they distribute user interface, application, and data management components between the Client and Server data processing systems. Two examples include the remote presentation type Client/Server application and the distributed data processing Client/Server application. In a remote presentation application, all the user interface functionality resides on the Client system and all other functionality resides on the Server system.

For a distributed data processing Client/Server system, the data management functionality is divided between the Client and Server systems. All other functionality is placed on the Client system. The distributed data processing Client/Server model allows databases to be split among multiple systems and fosters development of distributed transaction processing applications.

Transaction processing in a Client/Server environment may be either non-global or global. In a non-global client/server transaction, the same work takes place as in a traditional transaction, but the work is distributed in a Client/Server manner. For example, a travel agent may request an airline reservation via a workstation Client application program that has a graphical user interface. The Client application program communicates with a Server application program that manages the reservation database. The Server application program updates the database, commits or aborts its own work, and returns information to the Client application program, which notifies the travel agent.

A global transaction consists of multiple, coordinated database updates, possibly occurring on different computers. Global transactions are used when it is important that all databases are synchronized so that either all updates are made or none are made. Continuing with the previous example, the travel agent may also need to reserve a rental car and hotel room. The customer who is traveling wants to make sure that all reservations are coordinated; if a flight is unavailable, the hotel and car reservations are not needed. For the purpose of illustrating a global transaction, the airline, car, and hotel databases are on different transaction processing systems.

The global transaction begins when the travel agent requests the reservation from a workstation Client application program with a graphical user interface. The Client program contacts three Server application programs on different transaction processing systems. One Server program books a flight, another reserves a car, and the third makes a hotel reservation. Each of the Server application programs updates its respective database. The transactions processed by each of the Server application programs may be referred to as a subordinate transactions of the global transaction. A global transaction manager coordinates the updates to the three databases, and a subordinate transaction manager on each of the individual transaction processing systems coordinates locally with the Server application programs. The Server application programs return information to the Client application program.

A major advantage of global transaction processing is that tasks that were once processed individually are processed as a group, the group of tasks being the global transaction. The database updates are made on an all or nothing basis. For example, if an airline seat is not available, the hotel and car reservations are not made. Thus, with a global transaction, tasks that were once performed independently may be coordinated and automated.

As with non-global transactions, global transactions must possess the ACID properties. In order to preserve the ACID properties for a global transaction, the commit processing is modified to a two-phase commit procedure. Under a two-phase commit, a global transaction manager first requests that each of the subordinate transaction managers prepare to commit their updates to the respective databases. If all the local transaction managers respond that they are prepared to commit, the global transaction manager sends a commit request to the local transaction managers. Thus the two parts of the two-phase commit are prepare to commit the database updates and commit the database updates.

The purpose of the two-phase commit is to assist in database recovery in the event of unexpected hardware or software failures. In short, service requests must be rolled-back during database recovery if the global transaction has not been prepared, service requests must be rolled-forward if the global transaction has been prepared, and if the global transaction has been committed, no recovery processing is required for service requests that are part of the committed global transaction.

Correct functioning of two-phase commit processing is imperative for purposes of maintaining database integrity. If the software that implements two-phase commit does not function correctly, database corruption and lost data are possibilities.

SUMMARY OF THE INVENTION

Therefore it would be desirable to have an expedient means for testing the correct functioning of two-phase commit processing to protect against data loss and data corruption.

It is an object of the invention to partially perform two-phase commit for a global transaction to allow testing of recovery scenarios.

A further object is to prepare the individual service requests of a global transaction without preparing the global transaction itself.

Another object is to commit the individual service requests of a global transaction without committing the global transaction itself.

Yet another object is to suspend execution of a client application program without completing two-phase commit processing such that the client application program may be terminated and database recovery processing manually initiated.

A further object of the invention is to suspend execution of a client application during two-phase commit processing for a predetermined period of time to allow manual intervention in the termination of selected hardware and software components in the global transaction processing system, and returning control to the client application program and automatically initiating database recovery processing.

The foregoing and other objects are attained in a transaction processing system for processing global transactions. The transaction processing system includes a client system and a server system, wherein the client system is a data processing system having transaction processing software for processing global transactions, and the server system is a data processing system having transaction processing software for processing global transactions. The client system includes a client application program for initiating a global transaction and initiating local service requests, and the server system has a server application program for processing one or more service requests that are part of the global transaction. A global transaction manager on the client system manages global transactions initiated by the client application program.

Testing of two-phase commit processing and recovery processing is accomplished with a client application program that defines test cases and with test functions provided by the global transaction manager. The client application program initiates a global transaction and issues service requests that are part of the global transaction. After receiving responses to the service requests, the client application program initiates one of a suite of test functions provided by the global transaction manager.

The global transaction manager provides four test functions that are program callable by the client application program. The four test functions include: prepare-test, prepare-test-with-timed-wait, commit-test, and commit-test-with-timed-wait. The prepare-test and prepare-test-with-timed-wait commands are used by the client application program to prepare the service requests of a global transaction without preparing the global transaction itself. When either the prepare-test or prepare-test-with-timed-wait is used to construct a recovery scenario, all the service requests of the global transaction should be rolled-back upon completion of database recovery processing.

The commit-test and commit-test-with-timed-wait commands are used by the client application program to commit the service requests of a global transaction without committing the global transaction itself. When either the commit-test or commit-test-with-timed-wait command is used to construct a recovery scenario, all the service requests of the global transaction should be rolled-forward upon completion of database recovery processing.

The prepare-test-with-timed-wait and commit-test-with-timed-wait commands provide a timed suspension of execution for the client application program within the control of the global transaction manager upon completion of the respective processing. The timed suspension allows manual intervention that may entail termination of selected hardware and/or software components. After the programmed period of time has expired, control is returned to the client application program. Because the client application program has control again, it may automatically initiate the desired database recovery processing.

Still other objects and advantages of the present invention will become readily apparent to those skilled in the art from the following detailed description, wherein only the preferred embodiment of the invention is shown, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

DETAILED DESCRIPTION

The present invention is implemented in software functioning according to the X/Open Distributed Transaction Processing (DTP) model, and is therefore described in terms of the model. Further information concerning the model may be found in the referenced documents. Even though described in terms of the X/Open DTP model, those skill in the art will recognize that the invention could be adapted to systems functioning under different distributed transaction processing models.

Figure 1:
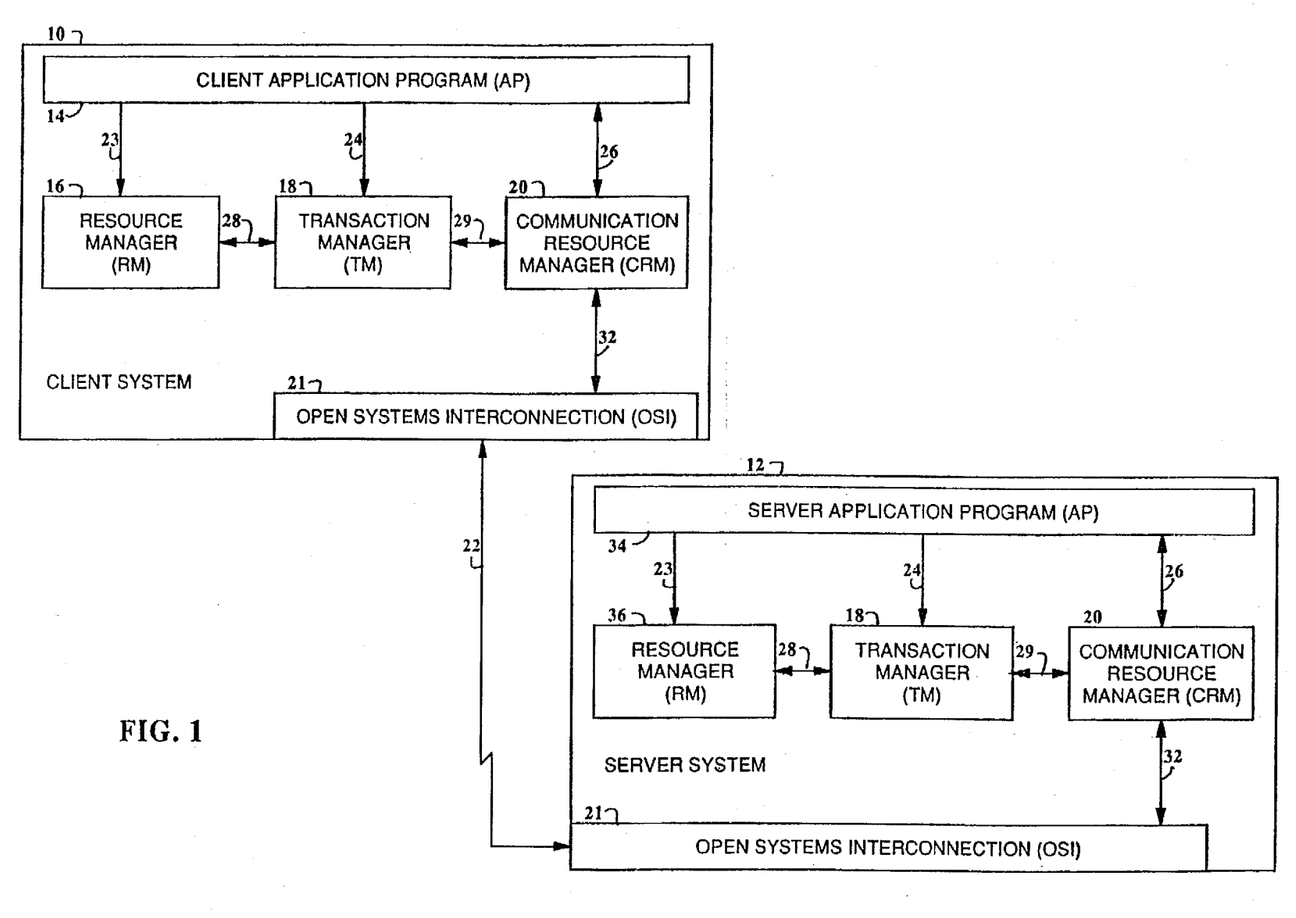
FIG. 1 is a block diagram of a Client System and a Server System.

FIG. 1 is a block diagram of a Client System 10 and a Server System 12. The Client System 10 and the Server System 12 each represent a separate data processing system. The client and server transaction processing systems are shown on separate data processing systems to assist in teaching the present invention, even though the distributed transaction processing model chosen to implement the invention permits client and server application programs on the same data processing system. The data processing system of the Client System could be a U6000 Series data processing system, and the Server System could be a 2200/500 Series data processing system, both available from Unisys Corporation.

Each of the Systems 10 and 12 is shown with and executes software that conforms to the X/Open™ Open/OLTP Distributed Transaction Processing (DTP) architecture, referenced hereafter as "Open/OLTP". X/Open™ is a trademark of X/Open Company Limited. Directional lines indicate the direction in which processing control may flow between the software components. The Open/OLTP model is a software architecture that enables multiple application programs to share resources and to participate in processing global transactions. The Open/OLTP model is more fully described in the *X/Open Guide, Distributed Transaction Processing Reference Model* as published by the X/Open Company Ltd., U.K.

The Client Application Program (AP) 14 is a user-defined software component that defines global transaction boundaries and specifies actions that constitute global transactions. It also provides access to one or more resources that are required by a transaction. In a global transaction, two or more APs perform their individual functions which when combined make up the global transaction. One of the APs will be the superior AP, that is the AP that starts and finishes the global transaction. The other APs will be subordinate. A hierarchy of APs may be established where a subordinate AP is superior to another AP.

A Resource Manager (RM) 16 provides access to a resource for the AP 14. The Open/OLTP model permits multiple resource managers. Database management systems and file access systems are examples of system software components that act as RMs.

The APs begin and end transactions under the control of a Transaction Manager (TM) 18. The TM is a system software component that assigns transaction identifiers to global transactions, monitors their progress, coordinates their completion, and coordinates failure recovery. The TM enforces the transaction property of atomicity. If a global transaction is being processed, the TM adheres to the two-phase Commit transaction processing protocol.

Communication between the Client AP 14 and other APs that are participating in global transactions, and communication between the TM 18 and TMs on separate data processing systems are controlled by the Communication Resource Manager (CRMs) 20. In Open/OLTP DTP, the reference model for system components that provide the underlying communication services that the CRMs require are defined in ISO 7498 which is the ISO Reference Model for Open System Interconnection (OSI). The Open Systems Interconnection 21 provides communication services between the Client System 10 and the Server System 12. Communication Line 22 represents the physical connection between the Client and Server Systems. The Open/OLTP DTP model also supports proprietary communication protocols.

The Client AP 14 conducts a global transaction by using interfaces that system software components provide. The interfaces include: AP-RM 23, AP-TM 24, and AP-CRM 26. The AP-RM interfaces include the RM provided interfaces that provide the APs with access to resources. Examples of AP-RM interfaces include the Structured Query Language (SQL) and the Indexed Sequential Access Method (ISAM).

The AP-TM interface 24 is provided by the TM to define global transaction boundaries. The AP-TM interface is also referenced as the TX interface. Further information on the TX interface is available in *Distributed Transaction Processing: The TX (Transaction Demarcation) Specification*, X/Open Company Limited, U.K., (1992).

The AP-CRM 26 interface is provided by the CRM 20 to the Client AP 14. The AP-CRM interface is also referenced as the XATMI interface. The XATMI interface allows APs to communicate with other APs during the processing of global transactions. Additional information on the XATMI interface is available in *Distributed Transaction Processing: The XATMI Specification*, X/Open Company Limited, U.K., (1993).

The TM-RM interfaces 28 are similar to the AP-RM interfaces and are used for purposes of transaction control (preparing, committing, or rolling-back). The TM-RM Interface 28 and TM-CRM Interface 29 are described further in XA Interface, *Distributed Transaction Processing: The TX (Transaction Demarcation) Specification*, X/Open Company Limited, U.K., (1992). The Client CRM 20 to OSI 21 Interface 28 is described in the X/Open Specification entitled *ACSE/Presentation: Transaction Processing API (XAP-TP)*.

The Server System 12 is shown with a Server Application Program (AP) 34. The Server AP receives a Service Request from the Client AP 14, processes the Service Request with its local Resource Manager 36, and returns a Reply to the Client AP as required.

The problem solved by the invention and the implementation of the invention may be better understood by way of comparison between the way in which normal transaction processing occurs and the way in which the invention functions in the described implementation. The way in which normal transaction processing occurs is presented in FIG. 2, and the implementation of the invention is described in the remaining Figures.

Figure 2:
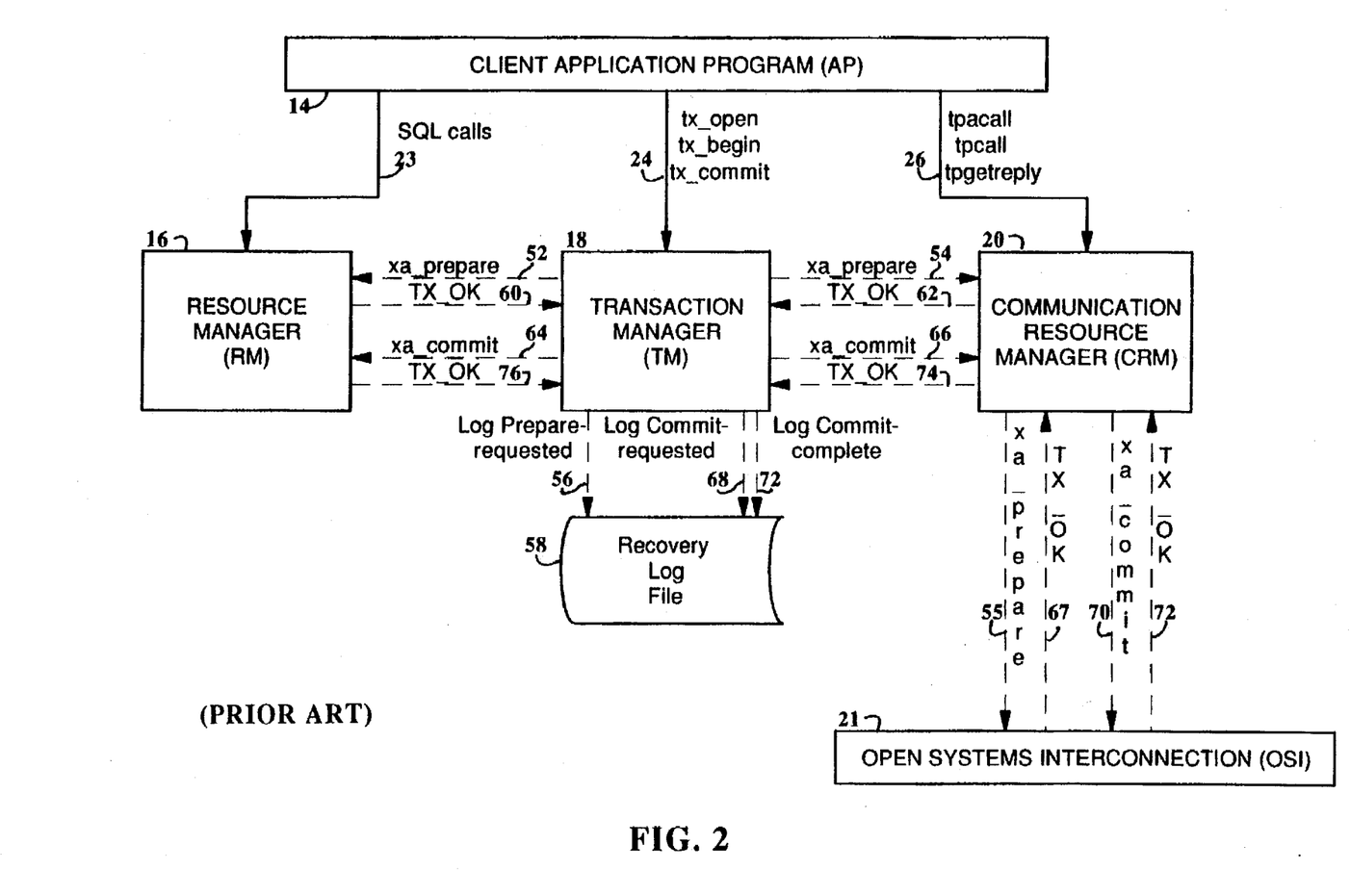
FIG. 2 is a block diagram that illustrates the flow of control for a global transaction according to the X/Open DTP model.

FIG. 2 is a block diagram that illustrates the flow of control for a global transaction according to the Open/OLTP DTP model. Solid directional lines denote a sequence of program calls between software components. Pairs of dashed directional lines denote a particular program call and returned control and a status.

With reference to FIG. 2, the following pseudo-code illustrates the Open/OLTP Application Programming Interface (API) commands requested by a Client AP 14 for a global transaction:

tx_open
tx_begin
tpacall ("Remote_service_1")
tpcall ("Local_service_1")
tpgetreply ("Remote_service_1")
tx_commit The command tx_open instructs the Transaction Manager (TM) 18 to open a selected Resource Manager (RM) 16. The global transaction is started with the TM with the command tx_begin. An asynchronous service request is issued to a remote System 12 for processing as indicated by the tpacall ("Remote_service_1") command to the Communication Resource Manager (CRM) 20. A local service request is issued via the CRM with the tpcall ("Local_service_1") command. Control is not returned to the Client AP from the tpcall command until a response is received from the local RM. To obtain a response message from the remote System 12, the tpgetreply ("Remote_service_1") command is initiated. Once the response message from Remote_service_1 is received, the tx_commit command is invoked to perform two-phase commit for the local and remote database updates resulting from service requests.

In processing the tx_commit command, the TM 18 initiates xa_prepare commands in both the RM 16 and CRM 20, respectively referenced 52 and 54, so that the local RM performs the prepare operation and the remote RM 36 performs the prepare operation. The TM logs that it has initiated the prepare phase by logging, as indicated by Line 56, a Prepare-requested record to the Recovery Log File 58. The CRM initiates xa_prepare commands on remote Systems 12 as shown by Line 55. When both the RM 16 and the CRM 36 respond with a status of OK, respectively referenced 60 and 62, the global transaction is deemed to be in a prepared state and the TM immediately initiates xa_commit commands to the local RM 16 and CRM 20, respectively referenced as 64 and 66. The CRM responds with an OK status once it has received an OK status from remote Systems 12 as shown by Line 67. Once a global transaction has reached a prepared state, all database updates resulting from service requests within the global transaction must be rolled-forward if a hardware or software failure occurs and recovery of a database is thereafter required. Hardware or software failures where database recovery is required are hereinafter referenced as "recovery scenarios" for short. If a global transaction does not reach a prepared state prior to a recovery scenario, then all database updates must be rolled-back.

The TM 18 denotes that all service requests have been prepared by logging, as shown by Line 68, a Commit-requested record to the Recovery Log File 58. If a system failure occurs before the Commit-requested record is logged, all service requests are rolled-back during recovery processing. If a system failure occurs after the Commit-requested record is logged, all service requests are rolled forward during recovery processing. The RM 16 performs the local commit operation, and the CRM 20 initiates xa_commit operations on remote Systems 12 as shown by Line 70. When the remote Systems 12 respond with an OK status as shown by Line 72, the CRM returns an OK status to the TM as shown by Line 74. The local RM 16 returns an OK status to the TM as shown by Line 76. Once all the Resource Managers have responded with an OK status, the TM logs a Commit-complete record in the Recovery Log File. Line 78 shows the logging of the Commit-complete record. The Commit-complete record indicates that the transaction is complete and no recovery actions are required if an unexpected software or hardware failure occurs.

It is critical that both the application programs and the software that supports two-phase commit processing function correctly because of the possible consequences of incorrect operation. An error in the logic of the software may result in lost or corrupt data. It would therefore be desirable to have an expedient means for testing two-phase commit recovery scenarios. However, the Open/OLTP DTP model does not define how to place global transactions in a specific state, and therefore, it is cumbersome to ascertain the exact state of a transaction when recovery is required correspondingly difficult to determine whether recovery processing was correctly performed. The difficulty with the X/Open DTP model is that once a TM 18 is told to initiate commit processing, the Client AP 14 has no control over the state of the transaction, and it is therefore difficult to test recovery scenarios.

Figure 3:
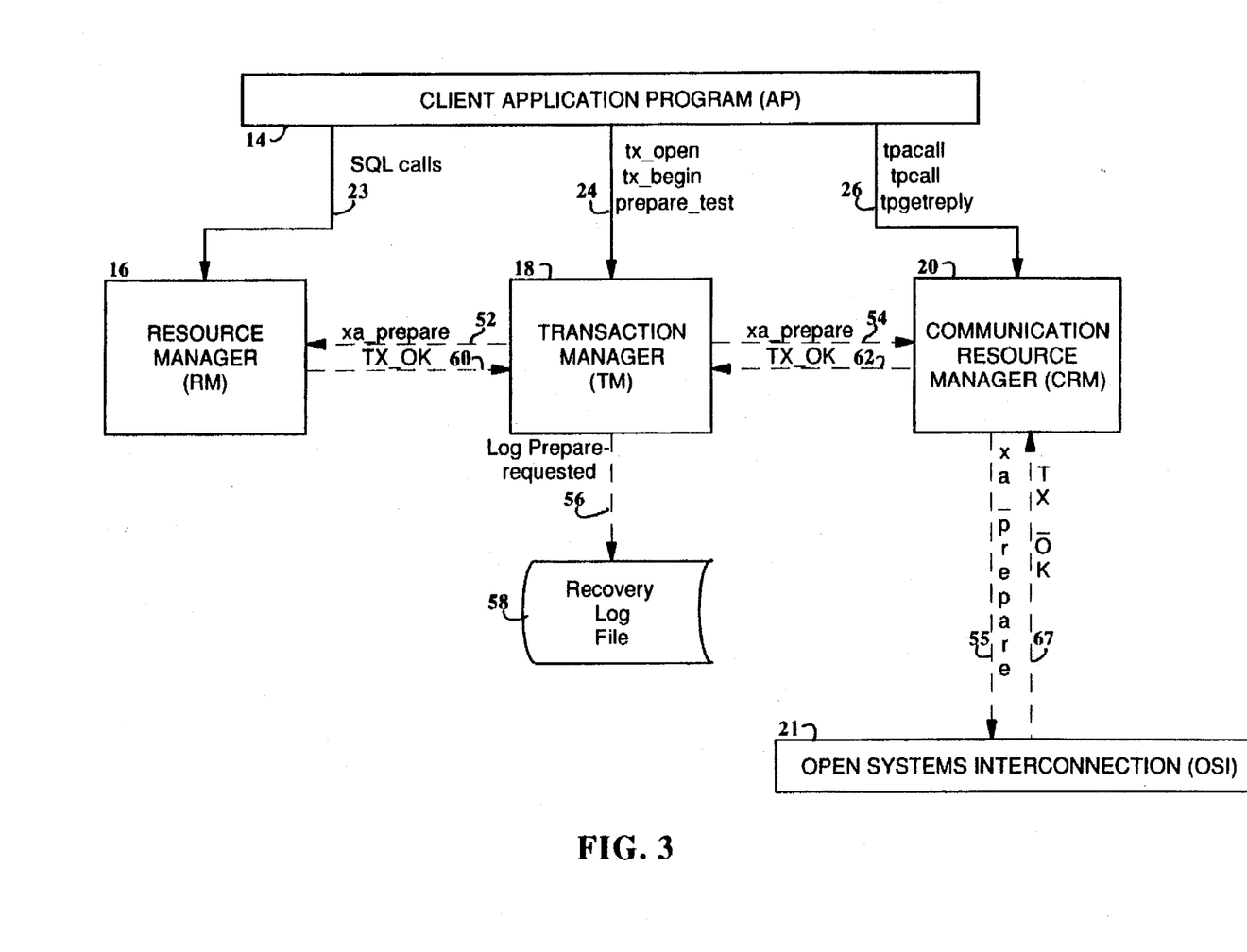
FIG. 3 is a block diagram that illustrates the flow of control for a global transaction wherein the Client AP initiates a prepare-test command with the Transaction Manager to obtain a desired state for the global transaction.

FIG. 3 is a block diagram that illustrates the flow of control for a global transaction wherein the Client AP initiates a prepare-test command with the Transaction Manager to obtain a desired state for the global transaction. The prepare-test command results in all service requests being placed in a prepared state with respect to their respective RMs 16 and 36, but the global transaction being viewed as unprepared from the perspective of the TM 18 managing the global transaction. With reference to FIG. 3, the following pseudo-code illustrates the Open/OLTP Application Programming Interface (API) commands requested by a Client AP 14 for forcing a desired state for a global transaction for testing a recovery scenario:

tx_open
tx_begin
tpacall ("Remote_service_1")
tpcall ("Local_service_1")
tpgetreply ("Remote_service_1")
prepare-test The pseudo-code described above differs from that presented with FIG. 2 in that the last statement initiates a prepare-test command with the TM 18. The other statements are the same. The TM provides the prepare-test command to test a recovery scenario in which all service requests should be rolled-back. The prepare-test commands results in the global transaction being placed in a prepared state in the RMs 16 and 36 and in an unprepared state from the perspective of the TM 18. As FIG. 3 illustrates, only the Prepare-requested record is logged to the Recovery Log File 58, and the commit phase of processing is not initiated. Upon return of OK status's from the RM and CRM 20, the TM indefinitely suspends its processing to allow manual intervention in constructing the recovery scenario. The manual intervention may consist of terminating the Client AP 14, Server APs, system software, or hardware operation. After the selected hardware and/or software is terminated, the required software and hardware of the Client System 10 and Server System 12 are restarted and recovery processing initiated. Upon completion of recovery processing, all service requests should have been rolled-back.

Figure 4:
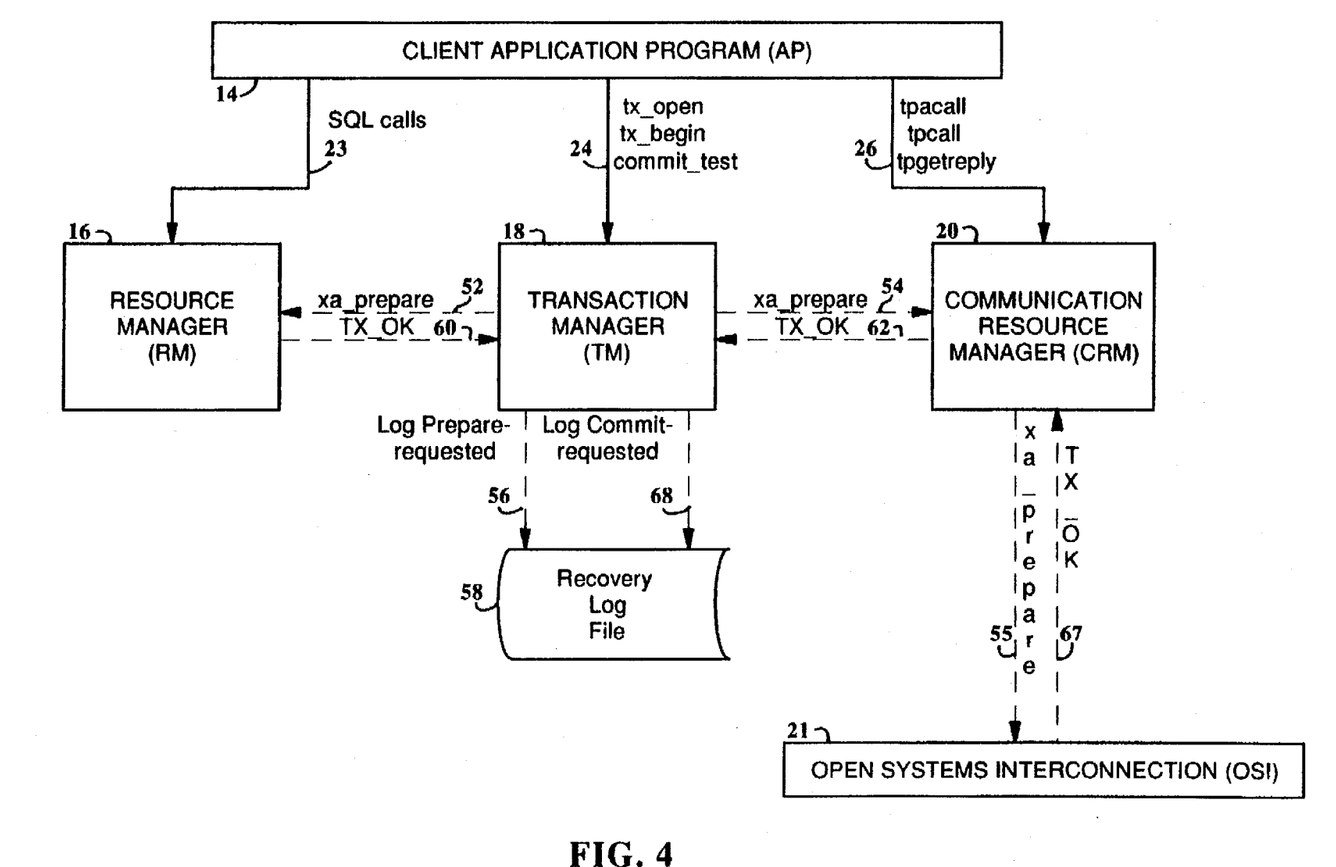
FIG. 4 is a block diagram that illustrates the flow of control for a global transaction wherein the Client AP initiates a commit-test command with the Transaction Manager to obtain a desired state for the global transaction.

FIG. 4 is a block diagram that illustrates the flow of control for a global transaction wherein the Client AP initiates a commit-test command with the Transaction Manager to obtain a desired state for the global transaction. The commit-test function places all service requests that are part of a global transaction in a prepared state from the perspective of the RMs 16 and 36 and from the perspective of the TM 18. The result of processing this test function is that all the service requests should be rolled forward during database recovery. With reference to FIG. 4, the following pseudo-code illustrates the Open/OLTP Application Programming Interface (API) commands requested by a Client AP 14 for forcing a desired state for a global transaction for testing a recovery scenario:

tx_open
tx_begin
tpacall ("Remote_service_1")
tpcall ("Local_service_1")
tpgetreply ("Remote_service_1")
commit-test The pseudo-code described above differs from that presented with FIG. 2 in that the last statement initiates commit-test with the TM 18. The other statements are the same. The TM provides the commit-test command to test a recovery scenario in which all service requests are rolled-forward. The commit-test command results in the global transaction being placed in a prepared state in the RMs 16 and 36 and in a prepared state from the perspective of the TM 18. As FIG. 4 illustrates, both the Prepare-requested and the Commit-requested records are logged to the Recovery Log File 58. However, the commit phase of processing is not initiated. The logging of the Commit-requested record indicates that all the service requests have been placed in a prepared states.

Figure 5:
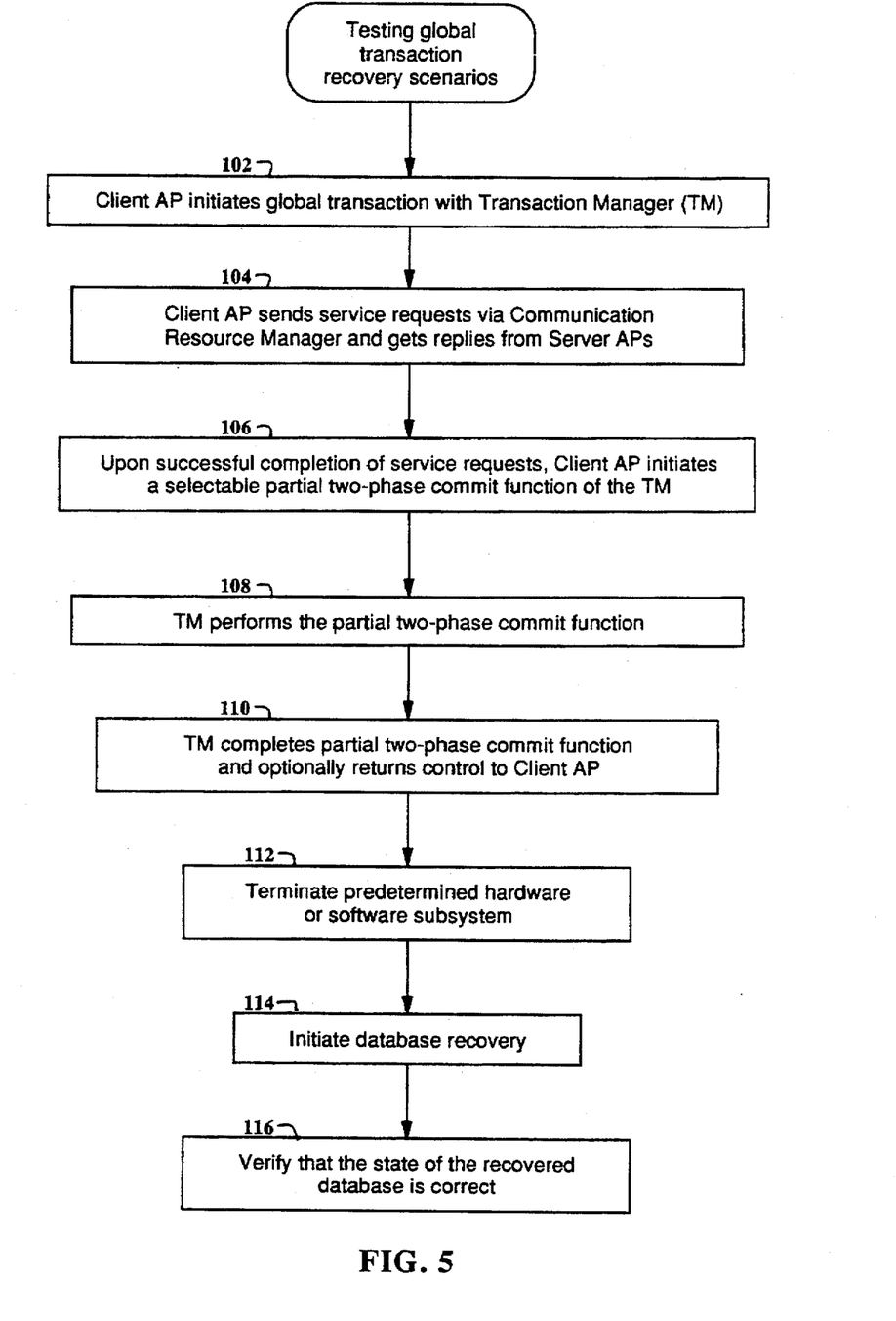
FIG. 5 is a flowchart that shows the overall processing for testing recovery scenarios for a global transaction.

FIG. 5 is a flowchart that shows the overall processing for testing recovery scenarios for a global transaction. At Step 102, the Client AP 14 initiates a global transaction with a Transaction Manager (TM) 18. Step 102 corresponds to the tx_open and tx_begin pseudo-code statements described above. The Client AP sends the service requests that comprise the global transaction at Step 104. For asynchronous service requests, a tpacall is made to the CRM 20, and for synchronous requests, a tpcall is made. Before processing continues, the Client AP obtains responses for the service requests.

If the service requests were all successfully processed, the Client AP 14 initiates a partial two-phase commit operation at Step 106. Four test functions, the processing of which results in four different states for the global transaction, are provided by the TM 18. The commands include prepare-test, prepare-test-with-timed-wait, commit-test, and commit-test-with-timed-wait. The processing performed by the TM for each of the four test functions is further described in FIGS. 6, 7, 8, and 9.

At Step 108, the TM 18 performs the command selected by the Client AP 14 to test two-phase commit recovery processing. The TM completes processing of the two-phase commit test function and then optionally returns control to the Client AP at Step 110. Whether control is returned to the Client AP depends upon the test function initiated by the Client AP. For the prepare-test and commit-test functions, control is not returned to the Client AP and manual intervention is performed to simulate a hardware or software failure. For the prepare-test-with-timed-wait and commit-test-with-timed-wait, control is returned to the Client AP along with a Hazard status. At Step 112, predetermined hardware and/or software subsystems are terminated to simulate a failure.

When the TM 18 discovers that there has been a failure in the two-phase commit processing, it initiates recovery and returns a hazard status to the Client AP 14. The hazard status notifies the Client AP that there was a failure during two-phase commit processing and that recovery of the global transaction is in progress. For the prepare-test-with-timed-wait, the status returned is TX_HAZARD_ROLLBACK to indicate that service requests associated with the global transaction will be rolled-back. For the commit-test-with-timed-wait, the status returned is TX_HAZARD to indicate that the service requests associated with the global transaction will be rolled forward. After control is returned to the Client AP from the TM and either a TX_HAZARD_ROLLBACK or a TX_HAZARD status is returned, the Client AP may initiate database queries to verify that the service requests were recovered correctly.

Database recovery is initiated at Step 114. Database recovery software (not shown) reads records from the Recovery Log File 58 to reconstruct the database. For global transactions for which a Commit-complete record was written, no action is taken. For global transactions for which a Commit-complete record was not written and a Commit-requested record was written, the associated service requests are rolled forward. The service requests for global transactions having only a Prepare-requested record in the Recovery Log File are rolled-back. Based on the chosen recovery scenario, the correct functioning of the two-phase commit processing and recovery processing may be verified by comparing the contents of the recovered database to a set of expected results as shown by Step 116.

Figure 6:
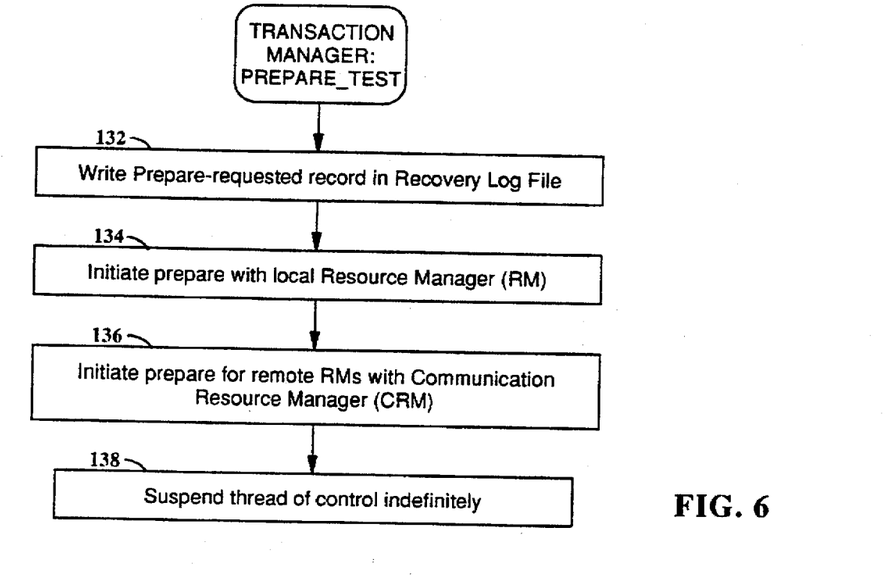
FIG. 6 is a flowchart of processing performed by the Transaction Manager (TM) for the prepare-test command.

FIG. 6 is a flowchart of processing performed by the Transaction Manager (TM) 18 for the prepare-test command. The prepare-test command places a global transaction in a prepared state with respect to the RMs 16 an 36, but in an unprepared state with respect to the TM managing the global transaction.

Step 132 writes a Prepare-requested record in the Recovery Log File 58 to indicate that the prepare function is being initiated. Step 134 initiates a prepare function with the local RM 16 with an xa_prepare command. The RM 16 in turn puts the service request(s) it processed in a prepared state and returns an OK status if successful. Similarly, Step 136 initiates a prepare function with the CRM 20 with the xa_prepare command so that the prepare request is propagated to all remote RMs 36.

Step 138 suspends indefinitely the thread of control of the Client AP 14 within the TM 18. At this stage of processing, manual intervention is required to finish constructing the recovery scenario. In particular, the desired software or hardware subsystems may be terminated and recovery processing thereafter initiated.

Figure 7:
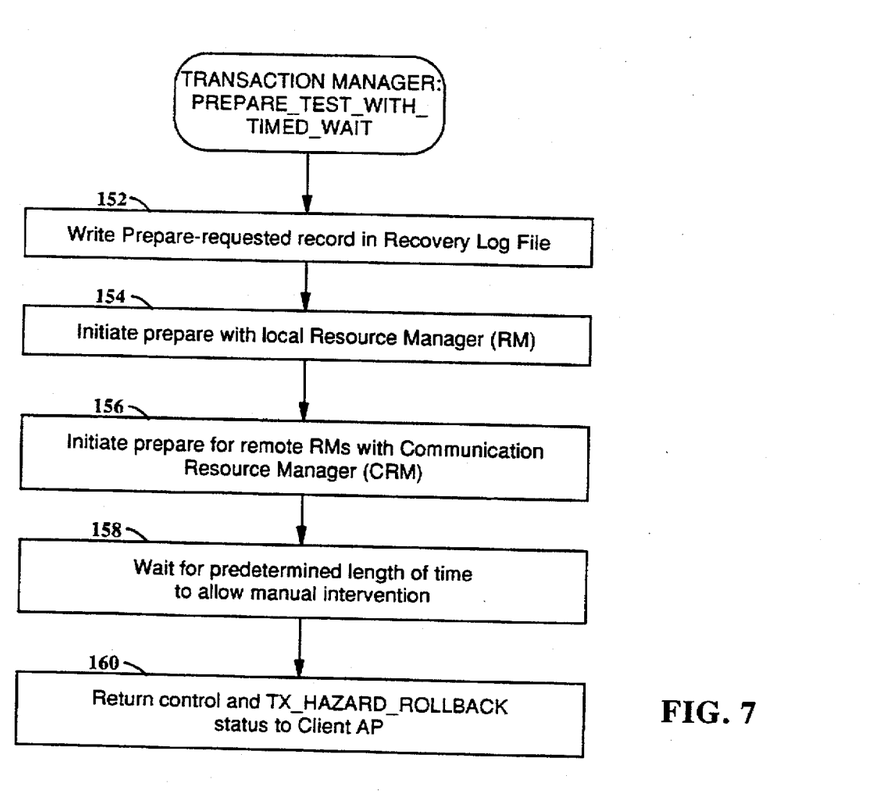
FIG. 7 is a flowchart of processing performed by the Transaction Manager (TM) for the prepare-test-with-timed-wait command.

FIG. 7 is a flowchart of processing performed by the Transaction Manager (TM) 18 for the prepare-test-with-timed-wait command. The prepare-test-with-timed-wait command places a global transaction in a prepared state with respect to the RMs 16 an 36, but in an unprepared state with respect to the TM managing the global transaction, and returns control to the Client AP 14 after waiting for a predetermined period of time.

Steps 152 through 156 of FIG. 7 are similar to Steps 132 through 136 of FIG. 6. The description accompanying FIG. 6 may be referenced for an explanation of Steps 152 through 156.

After initiating a prepare with the CRM 20 and receiving an OK status at Step 156, Step 158 waits a predetermined length of time to allow manual intervention in constructing a recovery scenario. The predetermined length of time may be programmatically configured and is discretionary based on the individual requirements of a particular recovery scenario. The manual intervention may consist of terminating one or more Server APs 34, terminating system software, or terminating system hardware. After waiting for the prescribed period of time, Step 160 returns control and a status of TX_HAZARD_ROLLBACK to the Client AP 14. Before the status is returned to the Client AP, the TM will initiate recovery processing.

Figure 8:
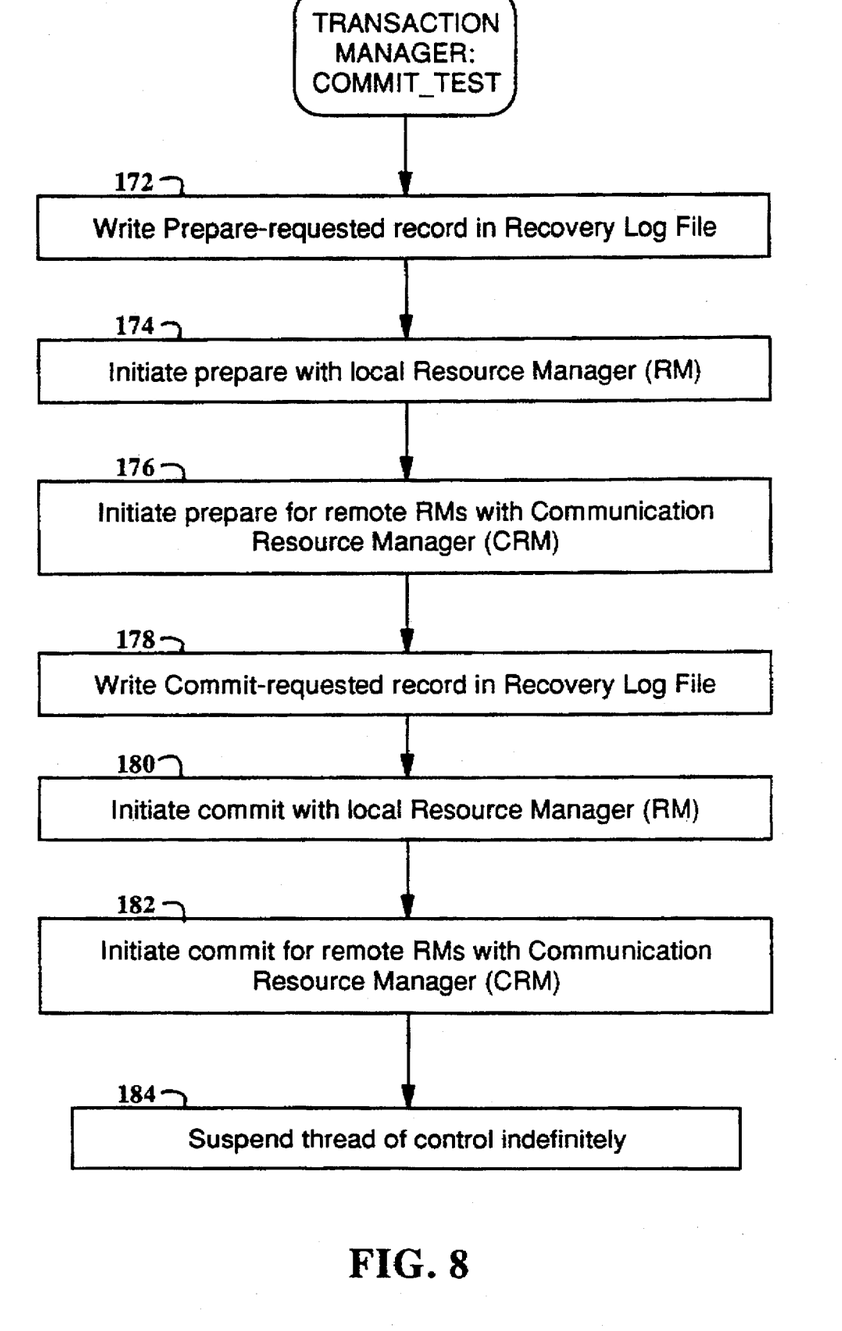
FIG. 8 is a flowchart of the processing performed by the Transaction Manager (TM) for a commit-test command.

FIG. 8 is a flowchart of the processing performed by the Transaction Manager (TM) 18 for a commit-test command. The commit-test command places all service requests that are part of a global transaction in a prepared state from the perspective of the RMs 16 and 36 and from the perspective of the TM managing the global transaction. The result of performing this test function is that all the service requests should be rolled forward during database recovery.

Step 172 writes a Prepare-requested record in the Recovery Log File 58 to indicate that the prepare function is being initiated. Step 174 initiates a prepare function with the local RM 16 with an xa_prepare command. The RM 16 in turn puts the service request(s) it processed in a prepared state and returns an OK status if successful. Similarly, Step 176 initiates a prepare function with the CRM 20 with the xa_prepare command so that the prepare request is propagated to all remote RMs 36.

Upon receipt of OK status's from the local RM 16 and the remote RM 36, the TM 18 writes a Commit-requested record in the Recovery Log File 58 as indicated by Step 178. This indicates that from the perspective of the TM managing the global transaction, all service requests have been prepared. Therefore, when database recovery is initiated, all the service requests should be rolled forward.

Step 180 initiates a commit function with the local RM 16 with an xa_commit command. The RM 16 in turn puts the service request(s) it processed in a committed state and returns an OK status if successful. Similarly, Step 182 initiates a commit function with the CRM 20 with the xa_commit command so that the commit request is propagated to all remote RMs 36.

Step 184 suspends indefinitely the thread of control of the Client AP 14 within the TM 18. At this stage of processing, manual intervention is required to finish constructing the recovery scenario. In particular, the desired software or hardware subsystems may be terminated and recovery processing thereafter initiated.

Figure 9:
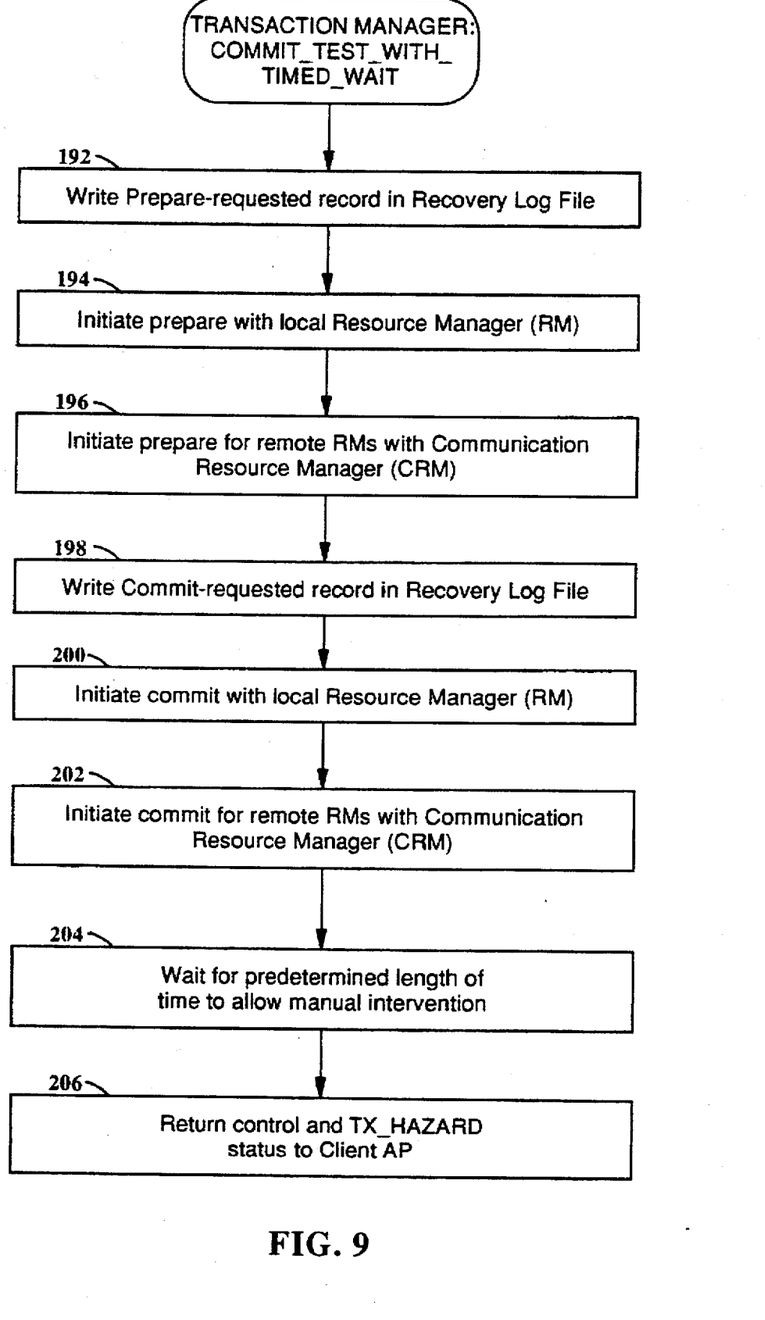
FIG. 9 is a flowchart of the processing performed by the Transaction Manager (TM) for a commit-test-with-timed-wait command.

FIG. 9 is a flowchart of the processing performed by the Transaction Manager (TM) 18 for a commit-test-with-timed-wait command. The commit-test-with-timed-wait command places all service requests that are part of a global transaction in a prepared state from the perspective of the RMs 16 and 36 and from the perspective of the TM 18. The result of performing this test function is that all the service requests should be rolled forward during database recovery. The commit-test-with-timed-wait differs from the commit-test function in that control is returned to the Client AP 14 from the TM after processing the commit-test-with-timed-wait command.

Steps 192 through 202 of FIG. 9 are similar to Steps 172 through 182 of FIG. 8. The description accompanying FIG. 8 may be referenced for a description of Steps 192 through 202.

After initiating a commit with the CRM 20 at Step 202 and receiving OK status's, Step 204 waits a predetermined length of time to allow manual intervention in constructing a recovery scenario. The manual intervention may consist of terminating one or more Server APs 34, terminating system software, or terminating system hardware. After waiting for the prescribed period of time, Step 206 returns control and a status of TX_HAZARD status to the Client AP 14. The TM 18 automatically initiates the appropriate recovery processing before returning the status to the Client AP.

Having described an exemplary embodiment of the invention in the drawings and accompanying description, those skilled in the art will recognize that various modifications to the exemplary embodiment could be made without departing from the scope and spirit of the claims set forth below:

I claim:

1. A method for testing recovery scenarios in a global transaction processing system using two-phase commit processing, wherein the global transaction processing system includes a client application program coupled to a plurality of resource managers for managing a plurality of databases, comprising the steps of:

initiating by the client application program a global transaction that includes a plurality of service requests;

processing said plurality of service requests against the plurality of databases;

initiating a test function by the client application program, wherein said test function performs a predetermined portion of the two-phase commit processing for said plurality of service requests;

performing said predetermined portion of the two-phase commit processing for said plurality of service requests;

automatically initiating database recovery processing;

returning control to the client application program without completing the two-phase commit processing of said global transaction; and     verifying that said plurality of databases are recovered correctly according to said predetermined portion of the two-phase commit processing completed by said test function.

2. The method of claim 1, wherein said step of performing said predetermined portion of the two-phase commit processing includes the step of preparing said plurality of service requests with the plurality of resource managers; and     said step of returning control includes the step of returning control to the client application program without preparing said global transaction.

3. The method of claim 1, wherein said step of performing said predetermined portion of the two-phase commit processing includes the steps of         preparing said plurality of service requests with the plurality of resource managers;

preparing said global transaction;

committing said plurality of service requests with the plurality of resource managers; and     said step of returning control includes the step of returning control to the client application program without committing said global transaction.

4. A method for testing recovery scenarios in a global transaction processing system, wherein the global transaction processing system includes a client application program coupled to a plurality of resource managers for managing a plurality of databases and a global transaction manager coupled to the client application program for managing the global transaction, comprising the steps of:

initiating a global transaction by the client application program, wherein said global transaction includes a plurality of service requests;

processing said plurality of service requests against the plurality of databases;

initiating a prepare-test function of the global transaction manager by the client application program;

writing a prepare-requested record by the global transaction manager to a log file;

preparing said plurality of service requests with the plurality of resource managers;

suspending execution of the client application program without preparing said global transaction to simulate a system failure;

performing database recovery processing for said plurality of service requests; and     verifying that said plurality of service requests are rolled-back in the plurality of databases.

5. The method of claim 4, wherein said suspending step further includes the step of indefinitely suspending execution of the client application program.

6. The method of claim 4, wherein said suspending step includes the step of suspending execution of said client application program for a predetermined period of time; and     further including the steps of automatically initiating database recovery processing; and     returning control to said client application program from the global transaction manager.

7. A method for testing recovery scenarios in a global transaction processing system, wherein the global transaction processing system includes a client application program coupled to a plurality of resource managers for managing a plurality of databases and a global transaction manager coupled to the client application program for managing the global transaction, comprising the steps of:

initiating a global transaction by the client application program, wherein said global transaction includes a plurality of service requests;

processing said plurality of service requests against the plurality of databases;

initiating a commit-test function of the global transaction manager by the client application program;

writing a prepare-requested record by the global transaction manager to a log file;

preparing said plurality of service requests with the resource managers;

preparing said global transaction with the global transaction manager;

committing said plurality of service requests with the resource managers;

suspending execution of the client application program without committing said global transaction to simulate a system failure;

performing database recovery processing for said plurality of service requests; and     verifying that said plurality of service requests are rolled forward in the plurality of databases.

8. The method of claim 7, wherein said suspending step further includes the step of indefinitely suspending execution of the client application program.

9. The method of claim 7, wherein said suspending step includes the step of suspending execution of said client application program for a predetermined period of time; and     further including the steps of automatically initiating database recovery processing; and     returning control to said client application program from the global transaction manager.

10. A method for testing recovery scenarios in a global transaction processing system, wherein said global transaction processing system includes a client application program, a server application program, a global transaction manager coupled to the client application program, a first resource manager coupled to the global transaction manager and coupled to the client application program for managing a database, a communication resource manager coupled to the client application program and coupled to the server application program, and a remote transaction manager coupled to the server application program, comprising the steps of:

initiating a global transaction with the global transaction manager by the client application program, wherein said global transaction includes a first service request and a second service request;

initiating said first service request and said second service request with the communication resource manager;

submitting said first service request to the server application program for processing;

submitting said second service request to the local resource manager for processing;

initiating a prepare-test function with the global transaction manager by said client application program when processing of said first service request and said second service request is complete;

writing a prepare-requested record by said global transaction manager to a log file;

issuing a prepare request to the local resource manager and to the remote resource manager;

preparing said first service request by the remote resource manager;

preparing said second service requests by the local resource manager;

suspending execution of the client application program before said global transaction is prepared;

terminating the client application program;

performing database recovery processing for said first service request and for said second service request; and     verifying that said first service request and said second service request are rolled back.

11. The method of claim 10, wherein said suspending step further includes the step of indefinitely suspending execution of the client application program.

12. The method of claim 10, wherein said suspending step includes the step of suspending execution of said client application program for a predetermined period of time; and     further including the steps of automatically initiating database recovery processing; and     returning control to said client application program from the global transaction manager.

13. A method for testing recovery scenarios in a global transaction processing system, wherein said global transaction processing system includes a client application program, a server application program, a global transaction manager coupled to the client application program, a first resource manager coupled to the global transaction manager and coupled to the client application program, a communication resource manager coupled to the client application program and coupled to the server application program, and a remote transaction manager coupled to the server application program, comprising the steps of:

- initiating a global transaction with the global transaction manager by the client application program, wherein said global transaction includes a first service request and a second service request;
- initiating said first service request and said second service request with the communication resource manager;
- submitting said first service request to the server application program for processing;
- submitting said second service request to the local resource manager for processing;
- initiating a prepare-test function with the global transaction manager by said client application program when processing of said first service request and said second service request is complete;
- writing a prepare-requested record by the global transaction manager to a log file;
- issuing a prepare request to the local resource manager and to the remote resource manager;
- preparing said first service request by the remote resource manager;
- preparing said second service requests by the local resource manager;
- writing a commit-requested record by the global transaction manager to said log file;
- suspending execution of the client application program without committing said global transaction;
- terminating the client application program;
- performing database recovery processing for said first service request and for said second service request; and
- verifying that said first service request and said second service request are rolled back.

14. The method of claim 13, wherein said suspending step further includes the step of indefinitely suspending execution of the client application program.

15. The method of claim 13,
- wherein said suspending step includes the step of suspending execution of said client application program for a predetermined period of time; and
- further including the steps of automatically initiating database recovery processing; and
- returning control to said client application program from the global transaction manager.

16. An apparatus for testing recovery scenarios in a global transaction processing system employing two-phase commit processing, comprising:
- a client data processing system;
- a server data processing system coupled to said client data processing system;
- client application program means operable on said client data processing system for initiating a global transaction that includes a plurality of service requests;
- service request processing means operable on said server data processing system for processing said plurality of service requests;
- initiation means coupled to said client application program means for initiating a test function, wherein said test function performs a predetermined portion of the two-phase commit processing for said plurality of service requests;
- performing means coupled to said service request processing means for performing said predetermined portion of the two-phase commit processing for said global transaction;
- recovery means coupled to said service request processing means for performing recovery processing for said plurality of service requests; and
- verification means coupled to said service request processing means for verifying that said plurality of service requests are recovered correctly according to said predetermined portion of the two-phase commit processing completed by said test function.

17. An apparatus for testing recovery scenarios in a global transaction processing system, comprising:
- a client data processing system;
- a server data processing system coupled to said client data processing system;
- client application program means operable on said client data processing system for initiating a global transaction that includes a plurality of service requests;
- service request processing means operable on said server data processing system for processing said plurality of service requests;
- initiation means coupled to said client application program means for initiating a prepare-test function;
- preparation means responsive to said prepare-test function and coupled to said service request processing means for preparing said plurality of service requests without preparing said global transaction;
- recovery means coupled to said service request processing means for performing recovery processing for said plurality of service requests; and
- verification means coupled to said service request processing means for verifying that said plurality of service requests are rolled-back.

18. An apparatus for testing recovery scenarios in a global transaction processing system, comprising:
- a client data processing system;
- a server data processing system coupled to said client data processing system;
- client application program means operable on said client data processing system for initiating a global transaction that includes a plurality of service requests;
- service request processing means operable on said server data processing system for processing said plurality of service requests;
- initiation means coupled to said client application program means for initiating a commit-test function;
- preparation means responsive to said commit-test function and coupled to said service request processing means for preparing said plurality of service requests and preparing said global transaction;
- commit means coupled to said service request processing means for committing said plurality of service requests without committing said global transaction;
- recovery means coupled to said service request processing means for performing recovery processing for said plurality of service requests; and
- verification means coupled to said service request processing means for verifying that said plurality of service requests are rolled forward.

* * * * *